Jan. 7, 1930.    G. B. CARLSON    1,742,948
SAW FRAME
Filed March 28, 1927    2 Sheets-Sheet 1

George Blaine Carlson
INVENTOR

BY Victor J. Evans
ATTORNEY

WITNESS

Patented Jan. 7, 1930

1,742,948

UNITED STATES PATENT OFFICE

GEORGE BLAINE CARLSON, OF CARVER, MINNESOTA

SAW FRAME

Application filed March 28, 1927. Serial No. 179,095.

This invention relates to portable saws and has for an object the provision of a light, rigid and durable frame structure for supporting a saw and the saw driving mechanism.

Another object of the invention is the provision of a saw frame which may be conveniently attached to a tractor and the power of the latter utilized for driving the saw, means being provided for securely holding the frame when the saw is in position for use, and for elevating the frame, so that the saw may be readily transported in attached position.

With the above and other objects in view, the invention further includes the following novel features and details of construction, to be hereinafter more fully described, illustrated in the accompanying drawings and pointed out in the appended claims.

In the drawings:—

Figure 3 is a top plan view of the saw.

Figure 4 is an end view.

Figure 5 is a side view showing the manner of supporting the saw detached from the tractor.

Figure 1:
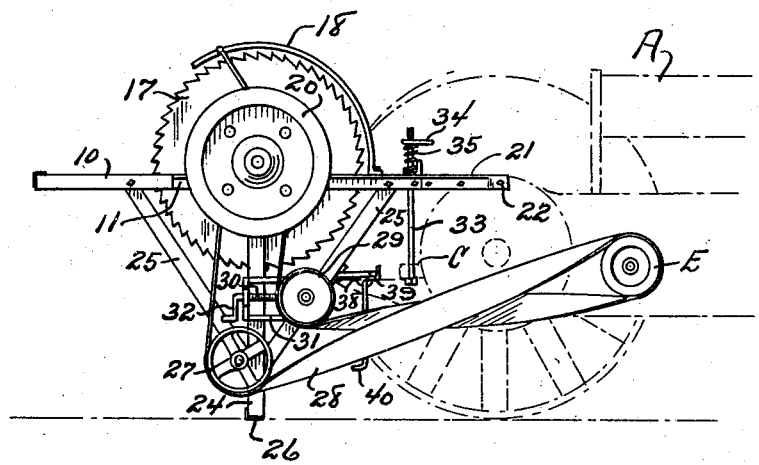
Figure 1 is an elevation illustrating the invention attached to a tractor, the latter being illustrated by dotted lines, while the saw is in position for use.

Referring to the drawings in detail wherein like characters of reference denote corresponding parts, the reference character A indicates generally a tractor. This tractor includes a tractor frame having rearwardly extending side bars B, and a draw bar cap C, the latter extending from the differential housing D.

The saw comprises a frame which includes spaced horizontally disposed bars 10 and 11. The bars are preferably of the angle type so that they may be light and strong. The bars 10 are connected by cross bars 12, one of which extends outward and is connected to the bar 11 as shown at 13, while a member 14 connects the bar 11 with one of the bars 10. A saw arbor or shaft 15 is mounted in bearings 16 supported by one of the bars 10 and the bar 11 and one end of this shaft has secured thereto a saw 17. This saw is positioned between the bars 10 and the latter form a saw table. A guard 18 rises from one of the bars 12 and extends upward over the saw. The opposite end of the shaft or arbor 15 carries a driving pulley 19 and a fly or balance wheel 20.

The bar 11 and one of the bars 10 are extended to provide inwardly inclined arms 21 which are adapted to be bolted upon opposite sides of the differential housing D as shown at 22, one of the bolts upon each side of the housing being preferably employed for this purpose. The frame and saw are thus pivotally secured to the differential housing. The arms 21 are capable of relative adjustment by means of a turnbuckle 23 so that their outer extremities may be accurately adjusted with respect to the width of the housing.

Extending downwardly from the frame are legs 24 and these legs are connected with the horizontal bars by means of inclined braces 25. The lower ends of the legs are connected by a bar 26, so that a light rigid supporting frame is provided for the saw.

Mounted upon one of the supporting legs is an idler or guide pulley 27 which is engaged by a driving belt 28, the latter passing around the pulley 19 and around the usual drive pulley E of the tractor. Supported by one of the inclined braces is a belt tightener pulley 29 which engages the belt and which is provided with a sliding bearing controlled by a threaded rod 30. The rod is guided in a frame 31 and is provided with a crank handle 32, so that the belt may be conveniently maintained at the proper tautness.

Figure 2:
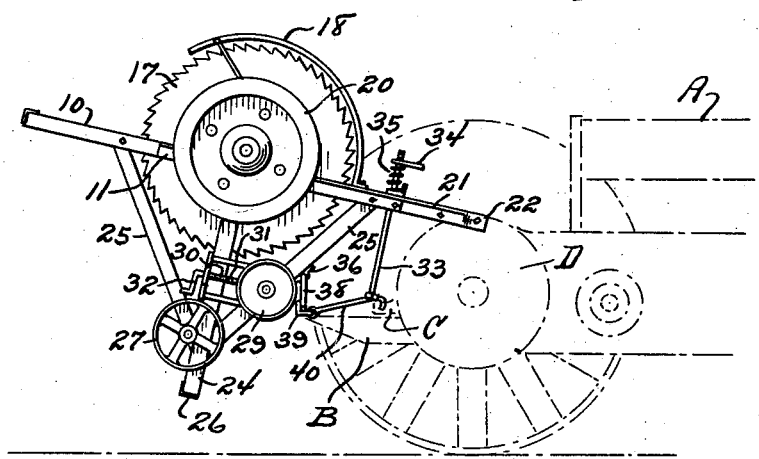
Figure 2 is a like view with the saw elevated for transportation.

The invention is designed to be secured to a tractor as shown in Figures 1 and 2 and is shown in operative position in Figure 1. When in this position the frame is prevented from moving pivotally upward by means of a rod 33 which is removably engaged in one of the openings of the draw bar cap C. This rod extends upward through the bar 13 and is provided with an adjusting nut 34, while interposed between this nut and the bar 13 is a coiled spring 35. By adjusting the nut, the saw frame is forced downward so that the legs are held in ground engaging position by the tension of the spring 35 and the saw will be prevented from moving pivotally upward when in use.

Extending transversely of the inclined braces 25 and mounted in suitable bearings 36 carried by the said braces is a shaft 37. This shaft is provided with angular extensions 38 at each end thereof and the extremities of these extensions have secured thereto an angle bar 39. The bar 39 is adapted to rest upon the extended ends of the side bars B of the tractor in the position shown in Figure 1 when the saw is in use, but when it is desired to transport the saw, the latter is elevated so that the bar 39 and shaft 37 occupy the position shown in Figure 2. In this position, the rod 33 is disengaged from the draw bar cap C and a hook 40 which is pivotally secured to the bar 39 is engaged with the draw bar cap C, so that the shaft 37 will be held against pivotal movement and the saw maintained in raised position.

If desired, legs 41 may be secured to the outer end of the arms 21 and these legs may be connected to the saw frame by inclined braces 42, so that the saw frame may be supported without the aid of the tractor.

The invention is susceptible of various changes in its form, proportions and minor details of construction and the right is herein reserved to make such changes as properly fall within the scope of the appended claims.

Having described the invention what is claimed is:—

1. In combination with a tractor having a draw bar cap, a portable saw comprising a frame, a saw mounted in said frame, means to drive the saw, means to pivotally secure one end of the frame to the tractor and means extending downward from the frame for removable engagement with the draw bar cap to resist upward pivotal movement of the frame.

2. In combination with a tractor having spaced rearwardly extending side bars and a draw bar cap, a portable saw comprising a frame, a saw mounted in said frame, means to drive the saw, means to pivotally secure one end of the frame to the tractor, means extending downward from the frame for removable engagement with the draw bar cap to resist upward pivotal movement of the frame, means carried by the frame for engagement with the side bars of the tractor to support the frame in elevated position when the draw bar engaging means is released and means extending from the side bar engaging means for removable engagement with the draw bar cap to hold said side bar engaging means in position.

In testimony whereof I affix my signature.

GEORGE BLAINE CARLSON.